United States Patent
Agatsuma et al.

(10) Patent No.: US 7,237,099 B2
(45) Date of Patent: Jun. 26, 2007

(54) MULTIPROCESSOR SYSTEM HAVING A PLURALITY OF CONTROL PROGRAMS STORED IN A CONTINUOUS RANGE OF ADDRESSES OF A COMMON MEMORY AND HAVING IDENTIFICATION REGISTERS EACH CORRESPONDING TO A PROCESSOR AND CONTAINING DATA USED IN DERIVING A STARTING ADDRESS OF A CPU-LINKED INTERRUPT HANDLER PROGRAM TO BE EXECUTED BY THE CORRESPONDING PROCESSOR

(75) Inventors: Shuji Agatsuma, Toyohashi (JP);
Yoshinori Teshima, Toyota (JP);
Kyoichi Suzuki, Toyohashi (JP)

(73) Assignee: DENSO Corporation, Kariya (JP)

( * ) Notice: Subject to any disclaimer, the term of this patent is extended or adjusted under 35 U.S.C. 154(b) by 231 days.

(21) Appl. No.: 10/329,986

(22) Filed: Dec. 27, 2002

(65) Prior Publication Data

US 2003/0145175 A1   Jul. 31, 2003

(30) Foreign Application Priority Data

Dec. 27, 2001   (JP)   ............................. 2001-397548

(51) Int. Cl.
*G06F 9/32*   (2006.01)
(52) U.S. Cl. ...................... 712/244; 712/230
(58) Field of Classification Search ............ 712/10–22; 711/147, 153
See application file for complete search history.

(56) References Cited

U.S. PATENT DOCUMENTS

| | | | | |
|---|---|---|---|---|
| 5,375,223 A | * | 12/1994 | Meyers et al. | ............... 711/151 |
| 5,418,970 A | * | 5/1995 | Gifford | ........................ 712/20 |
| 5,490,258 A | * | 2/1996 | Fenner | .......................... 711/1 |
| 5,555,430 A | * | 9/1996 | Gephardt et al. | ............. 712/16 |
| 5,696,913 A | * | 12/1997 | Gove et al. | ................. 710/317 |
| 5,822,601 A | * | 10/1998 | DeRoo et al. | ................ 712/43 |
| 5,848,279 A | * | 12/1998 | Wu et al. | ................... 710/268 |
| 6,169,442 B1 | * | 1/2001 | Meehan et al. | ............. 327/513 |
| 2002/0004888 A1 | | 1/2002 | Hayakawa et al. | ......... 711/148 |

FOREIGN PATENT DOCUMENTS

| | | |
|---|---|---|
| JP | 1-314367 | 12/1989 |
| JP | 2-91744 | 3/1990 |
| JP | 3-75959 | 3/1991 |
| JP | 5-189297 | 7/1993 |
| JP | 5-257903 | 10/1993 |
| JP | 5-289987 | 11/1993 |

(Continued)

*Primary Examiner*—Eddie Chan
*Assistant Examiner*—Ryan Fiegle
(74) *Attorney, Agent, or Firm*—Posz Law Group, PLC

(57) ABSTRACT

A multiprocessor system has a plurality of CPUs with respective local buses, and a memory which stores a plurality of programs to be executed by the CPUs and is connected to a common bus which can be accessed via the local buses, each local bus being connected to a CPU identification register which stores an identification value for identifying the corresponding CPU. When a program which is specific to a CPU is to be executed by that CPU, the corresponding identification value is read out from the identification register of the CPU and is judged, and branching to the appropriate program is performed based on the judgement result.

16 Claims, 7 Drawing Sheets

FOREIGN PATENT DOCUMENTS

| | | |
|---|---|---|
| JP | 4-133142 | 5/1994 |
| JP | 07-219918 | 8/1995 |
| JP | 11-272632 | 10/1999 |
| JP | 11-338833 | 12/1999 |
| JP | 2001-256205 | 9/2001 |
| JP | 2001-325148 | 11/2001 |

* cited by examiner

MULTIPROCESSOR SYSTEM HAVING A PLURALITY OF CONTROL PROGRAMS STORED IN A CONTINUOUS RANGE OF ADDRESSES OF A COMMON MEMORY AND HAVING IDENTIFICATION REGISTERS EACH CORRESPONDING TO A PROCESSOR AND CONTAINING DATA USED IN DERIVING A STARTING ADDRESS OF A CPU-LINKED INTERRUPT HANDLER PROGRAM TO BE EXECUTED BY THE CORRESPONDING PROCESSOR

BACKGROUND OF THE INVENTION

1. Field of Technology

The present invention relates to a multiprocessor computer system having a plurality of CPUs (Central Processing Units) which execute respective programs stored in a single memory.

2. Description of Prior Art

Computer systems are well known which are of multiprocessor configuration, having a plurality of CPUs to handle processing for various peripheral circuits and devices, to thereby achieve increased performance. With such a multiprocessor system however, it has been generally necessary in the prior art that respective control programs which are executed by the CPUs are stored in respectively different memories, each connected to a dedicated set of buses, i.e., with each memory only being accessible by a corresponding one of the CPUs.

However the size of a control program which is to be executed by a CPU of a computer system cannot be definitely known until development of the system has been completed. Hence, since the memory size (i.e., amount of memory capacity) that will be required for the control program is not accurately known during development, it is necessary to provide an excess amount of memory capacity. Thus in the case of a multiprocessor system, in which the various CPUs execute respectively different control programs which are stored in respective memories, the overall amount of excess memory capacity will become large.

To overcome this problem, it has been proposed in the prior art that all of the control programs of a multiprocessor system be stored in a single program memory. Such a system is disclosed for example in Japanese Patent Hei 5-289987. With that invention, the respective program memory for two CPUs is connected to respective local buses of the two CPUs. A bus access arbitration circuit performs control of data memory such as to enable access by both of the CPUs.

However since the CPUs execute respectively different processing, they must access respectively different memory areas containing the programs which they execute. The above prior art method of enabling access to data memory does not enable accessing of program memory, stored in a single memory unit (i.e., having only one set of memory addresses) by a plurality of CPUs. Thus, that prior art method cannot be directly applied to the problem of a multi-CPU system in which each of respective control programs which are executed by the various CPUs are stored together in a single memory..

Furthermore if each of the CPUs in such a multiprocessor system are identical devices (i.e., the same model of processor, produced by the same manufacturer) then it can be expected that the respective interrupt vectors that are assigned to various interrupt signals will be identical for each of the CPUs. Hence in the prior art, if all of the programs and routines which are executed by the various CPUs were to be stored in a single memory, it would be impossible for the plurality of CPUs to execute respectively different forms of interrupt handler processing in response to the any specific interrupt signal.

This can be understood by considering for example a very simple case in which each CPU automatically specifies the same interrupt vector in response to an interrupt signal which has been assigned the level 1 (execution priority) status. In that case, if a plurality of various types of interrupt might be assigned the level 1 status, then even if the corresponding interrupt signals were to be supplied to respectively different ones of the plurality of CPUs, all of the level 1 interrupts would have to be processed by the same interrupt handler routine. This is a serious disadvantage.

The term "interrupt vector" is used herein with the general significance of information which is generated in some manner when an interrupt signal is supplied to a CPU, which directs the CPU operation to branch to the starting address of a specific interrupt handler program. The term "bus" as used herein within the terms "local bus" and "common bus" is to be understood as signifying a set of buses which includes at least an address bus and data bus.

SUMMARY OF THE INVENTION

It is an objective of the present invention to overcome the above problems of the prior art, by providing a multiprocessor system having enhanced memory utilization efficiency, with control programs that are to be respectively executed by a plurality of CPUs being stored in a single memory.

To achieve the above objective, the invention provides a multiprocessor system having a plurality of CPUs which are connected via respective local buses to a common bus of a memory, with the CPUs executing respective control programs which are stored together within the memory, and a plurality of identification registers which are connected to respective ones of the local buses, with respectively different identification values (where an "identification value" consists of data expressing a numeric value, code, etc.) fixedly stored beforehand in each of the identification registers. When execution of respective control programs by the CPUs is to begin, (for example after a reset interrupt has occurred) each CPU is instructed to read out its corresponding identification value and to judge that value, and after performing any necessary initialization operations, to branch to the starting address of a control program which is selected based on the identification value.

It is a basic advantage of the invention that a plurality of control programs which are executed by respectively different CPUs can be stored in a single area of memory, i.e., in blocks of addresses which are respectively contiguous within a continuous range of addresses.

Since each of the CPUs can use the same address for readout of its own identification value from the corresponding identification register, only a single instruction is required in each interrupt handler program to effect readout of the identification values, for all of the CPUs, and the instruction can be identical for all of the interrupt handler programs. Hence, use of this instruction does not significantly increase the total program size.

Furthermore if a specific interrupt is to be processed by respectively different interrupt handler programs by each of the CPUs, these can be arranged as respective mutually separate routines within an interrupt handler program, with these being referred to in the following as CPU-linked routines. A preliminary instruction of an interrupt handler program designates that the identification value of the CPU which is executing that program is to be read out, and execution branching is then to be performed to the start of the appropriate CPU-linked routine, based on judgement of the identification value which has been read out. That is to say, each CPU performs self-identification by readout of its identification value. In that way, in response to any particular interrupt vector (i.e., which leads to the start of a specific interrupt handler program containing a plurality of CPU-linked routines as described above) each of the CPUs can execute respectively different types of interrupt processing.

It is also possible to configure such a system with one of the CPUs having no identification register connected to its address bus, i.e., a system having n CPUs, where n is a plural integer, but utilizing only (n−1) identification registers. In that case, if it is ensured that the data bus of that CPU will maintain a fixedly predetermined bit pattern during at least a specific time interval after the aforementioned readout address is generated, whereas the corresponding identification value will appear on the data bus in the case of any other CPU, it becomes possible for the CPU which is not connected to an identification register to effect self-identification, when it generates the identification register readout address.

DESCRIPTION OF PREFERRED EMBODIMENTS

Figure 1:
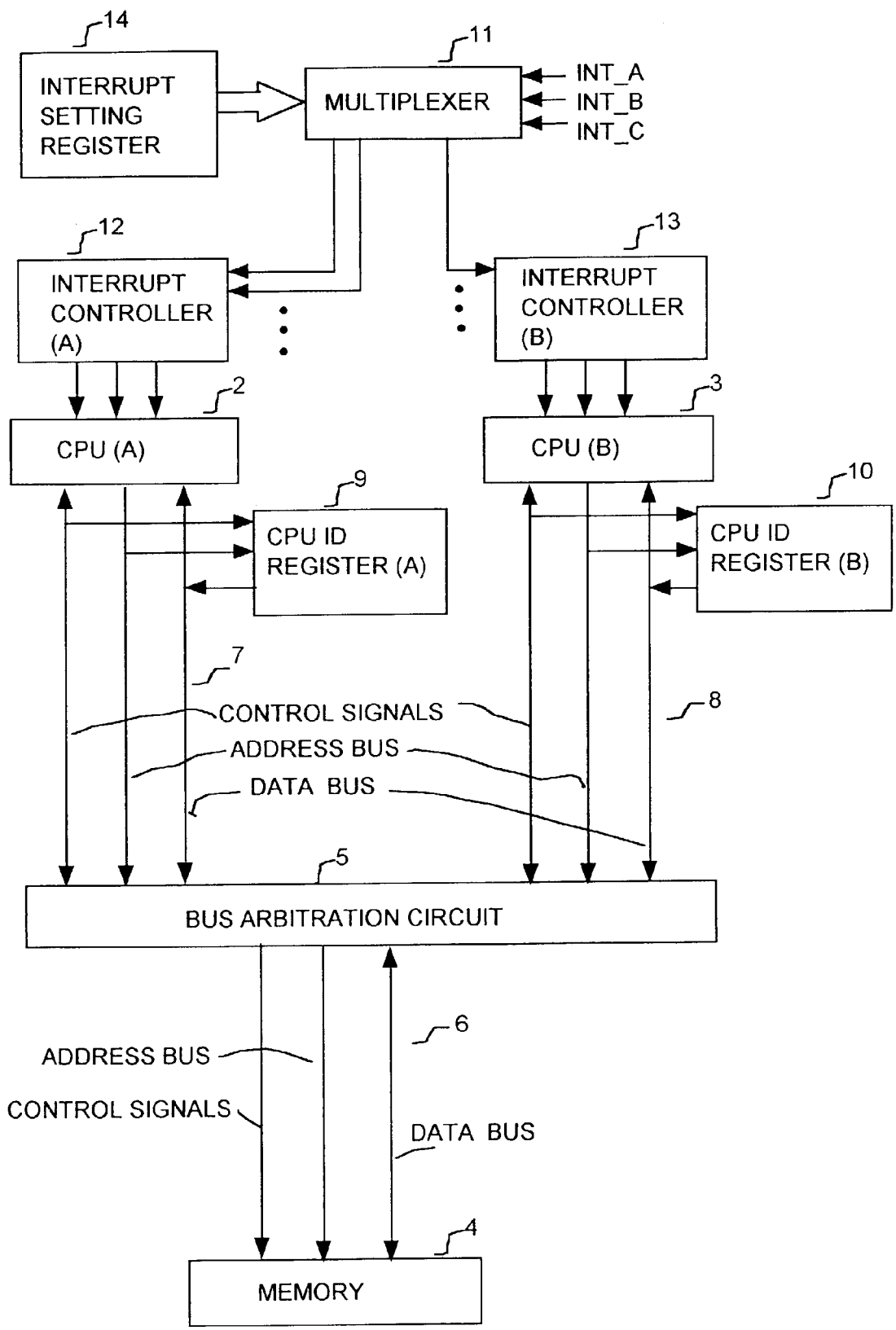
FIG. 1 is a block diagram illustrating the general circuit configuration of an embodiment of a multiprocessor system constituting a microcomputer.

FIG. 1 is a general system block diagram of an embodiment of a multiprocessor system, configured as a microcomputer having two CPUs 2 and 3. To simplify the diagram, only those system components which directly relate to the present invention are shown. System components and processing associated with the CPU 2 will be indicated in the following as "A-side", while components and processing associated with the CPU 3 will be indicated as "B-side". Although not shown in the drawing, each of the CPUs 2, 3 can access a plurality of peripheral circuits and devices such as for example a timer, DMA (Direct Memory Access) controller, serial controller, A/D converter, I/O ports, etc. Of these peripheral devices, there are some which can only be accessed by a specific one of the CPUs 2, 3, and others which can be accessed by both of the CPUs 2, 3.

Figure 2:
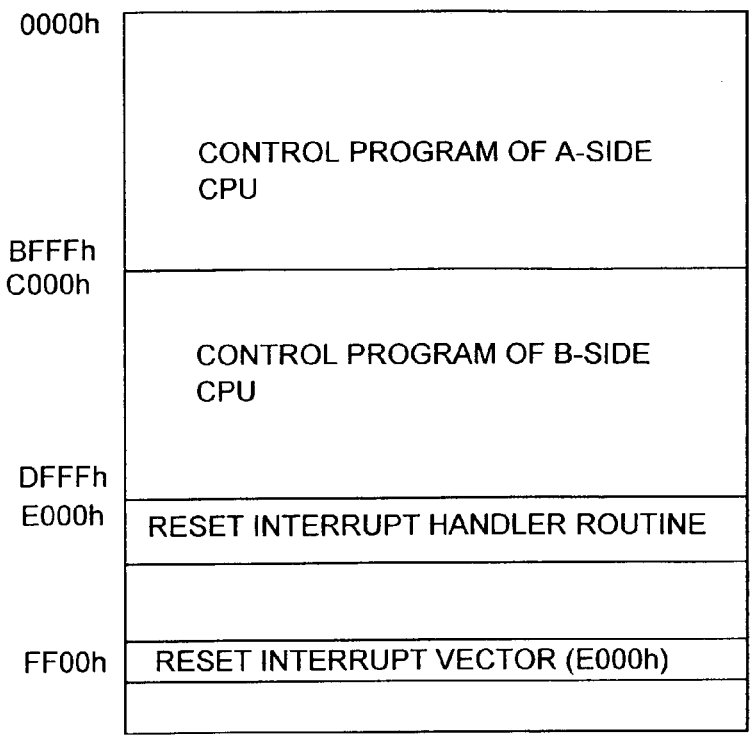
FIG. 2 is a conceptual diagram of the contents of a memory in the embodiment of FIG. 1.

As shown in FIG. 2, the control programs which are respectively executed by the CPUs 2, 3 are both stored in a memory 4, in respective contiguous address ranges of the memory 4. With this embodiment, the control program for the CPU 2 is assumed to be stored in the memory region extending from address 0000h to BFFFh of memory 4, while the control program for the CPU 3 is stored in the region extending from address C000h to DFFFh of memory 4. The CPUs 2, 3 are connected to respective local buses 7 and 8, i.e., which can be accessed only by the CPUs 2 and 3 respectively. The local buses 7, 8 are also connected to a bus arbitration circuit 5. The bus arbitration circuit 5 is connected via a common bus 6 to the memory 4. As shown in FIG. 1, each of the sets of buses 6, 7 and 8 includes an address bus, a data bus, and various control signal lines. When a CPU 2 or 3 has obtained the bus access right for the common bus 6, that CPU can then access the memory 4, via its local bus 7 or 8, the bus arbitration circuit 5, and the common bus 6.

The local bus 7 is also connected to a CPU identification register 9, and the local bus 8 is connected to a CPU identification register 10 (where the term "register" can signify any type of read-only data storage device). The identification registers 9, 10 have fixedly stored therein data expressing respectively different CPU identification values. Each of the registers 9, 10 responds to the same input address value, when supplied thereto from the corresponding CPU 2 or 3, by reading out its stored identification value and supplying that value to the corresponding CPU. The CPU then uses that value to (in effect) identify itself and thereby identify a specific one of a plurality of separate interrupt handler routines (referred to herein as CPU-linked routines) as the routine which is to be executed by that CPU.

Respectively different interrupt handler routines can thus be executed by the CPUs 2 and 3 in response to the same interrupt vector.

More specifically, interrupt signals can be supplied to the CPUs 2, 3 from a plurality of external circuits, indicated as the interrupt signals INT_A, INT_B, INT_C, . . . . shown in FIG. 1. With this embodiment it is assumed that these interrupt signals are distributed via a multiplexer 11 to a pair of interrupt controllers 12, 13, which are connected to the CPUs 2, 3 respectively. The allocation of interrupt signals by the multiplexer 11 is predetermined by data which are written beforehand into a interrupt setting register 14. This write-in may for example be performed by the CPU 2.

The interrupt controllers 12, 13 supply respective level-attached interrupt signals (i.e., interrupt signals having a specific interrupt level assigned thereto, for example a level that is in the range from 1 to 7) to the corresponding CPUs 2, 3, in response to interrupt signals supplied from the multiplexer 11. For simplicity of description, it is assumed that with this embodiment there is only one type of interrupt (interrupt source) corresponding to each level, so that each CPU determines an interrupt vector for an interrupt in accordance with its assigned interrupt level. It is also assumed that the relation between interrupt vector addresses and interrupt levels is fixedly determined (i.e., by hardware).

However it should be understood that the present invention is in no way limited to any of the various possible methods of generating and applying interrupt vectors, but instead is concerned with operations which occur after execution of an interrupt handler program has commenced.

As described hereinabove, the interrupt vector that is determined in response to an interrupt signal of particular interrupt source and interrupt level will generally be identical for each of CPUs that are of the same model from the same manufacturer, and that is assumed to be the case with this embodiment. When interrupt processing by a CPU occurs, and the instruction stored at the interrupt vector address is then executed, this causes the program execution by that CPU to branch to the starting address of a specific interrupt handler program, as in the prior art. However with the present invention, each interrupt handler program can consist of a plurality of independent sections, i.e., CPU-specific routines, corresponding to respective CPUs.

The following description will be given assuming the case of a reset interrupt, which has the highest interrupt level (level 7). This is predetermined as being a NMI (non-maskable interrupt), and is produced when some abnormal condition of the system has occurred.

The operation will be described referring to FIGS. 2 to 5. As shown conceptually in FIG. 2, the memory 4 has stored therein a reset interrupt handler program, in addition to the control programs that are executed by the A-side and B-side CPUs 2, 3 respectively. The memory 4 stores the interrupt vector for the reset interrupt, at the address FF00h. Specifically, the reset interrupt vector address contains an instruction which specifies that execution is to jump to the address (E000h), which is the start of the reset interrupt handler program.

Figure 3:
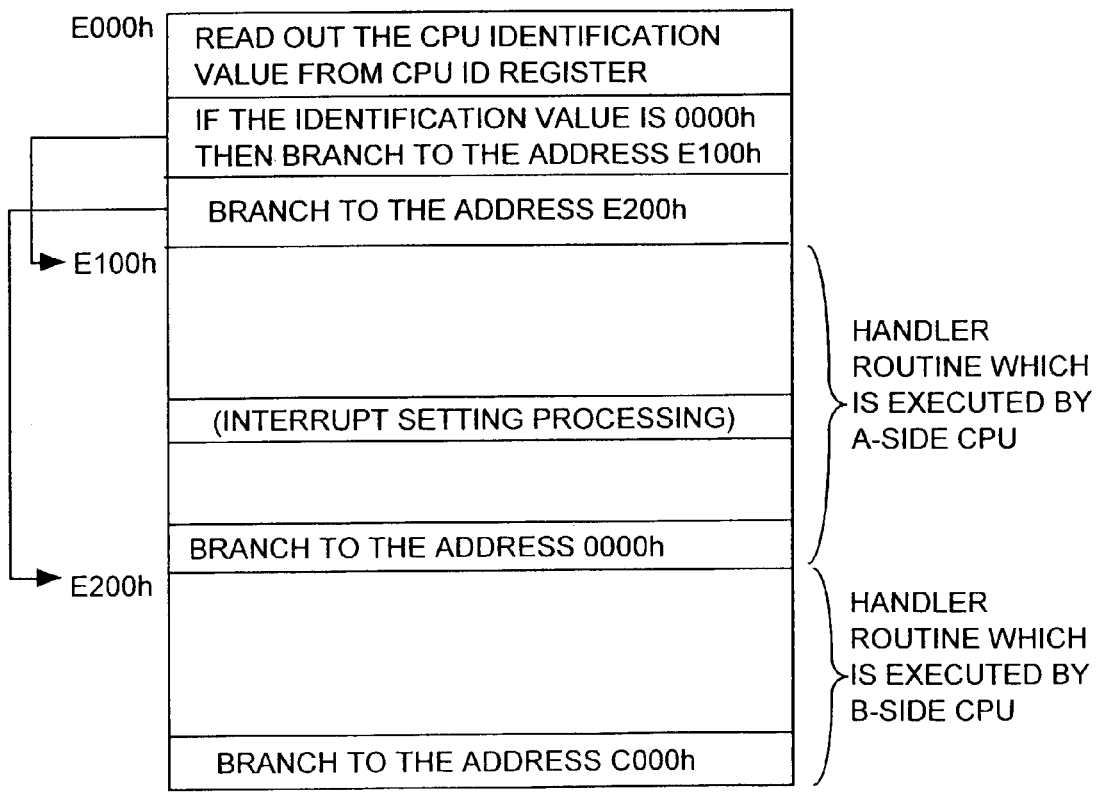
FIG. 3 is a conceptual diagram of an interrupt handler program which is stored in the memory of FIG. 2.
Figure 4:
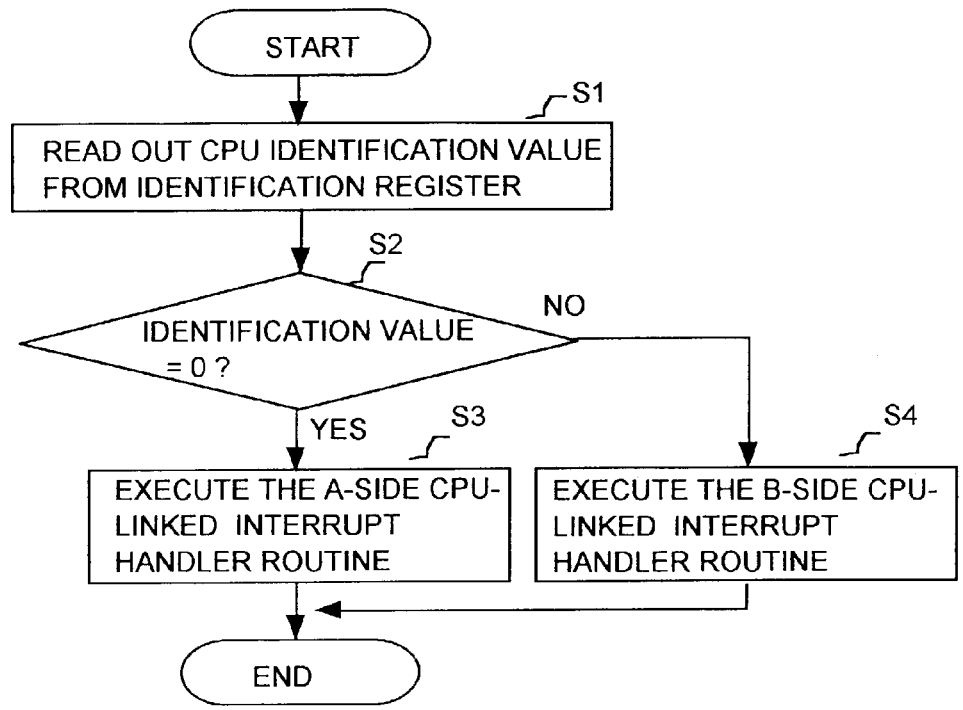
FIG. 4 is a basic flow diagram of the operation of the interrupt handler program of FIG. 3.

FIG. 3 is a conceptual diagram of the contents of the reset interrupt handler program. FIG. 4 is a flow diagram showing the general contents of that program. When each of the CPUs 2, 3 are released from the reset status after an abnormal operation condition of the system has occurred, then firstly, the contents of the reset interrupt vector address FF00h are read out and executed by each of the CPUs 2, 3. Each CPU responds by branching to the instruction which is stored at the address E000h, i.e., the starting instruction of the interrupt handler program. This instruction specifies that the readout address for the CPU identification register (which is common to both of the CPUs, as described above) is to be outputted on the local address bus of the CPU, that is to say, resulting in readout from each of the identification registers 9 and 10 (step S1). Respectively different CPU identification values, assumed to be 0000h and E011h with this embodiment, are thereby obtained from the identification registers 9 and 10, as input data values, by the CPUs 2 and 3 respectively.

In the next step (step S2) each of the CPUs 2, 3 judges the value which has been read out from the corresponding one of the identification registers 9, 10. If a CPU finds that the value is 0000h, then execution by that CPU branches to the program address E100h, as the start of the CPU-linked routine (within the reset interrupt handler program) which is specific to that particular CPU, and that routine is then executed until completion. It is assumed in FIG. 3 that that this applies to the CPU 2, i.e., the A-side CPU (step S3).

If the value read out by a CPU from the corresponding identification register is not 0000h, i.e., must be E100h, then (step S4) the CPU execution branches to the program address E200h, as the start of the reset interrupt handler routine which is specific to that particular CPU, (in this example, assumed to be the CPU 3, i.e., the B-side CPU.) That routine is then executed until completion.

In performing the A-side reset interrupt processing, the CPU 2 executes various initializing operations, and writes values into the interrupt setting register 14 such that interrupt signals (INT_A, INT_B, INT_C, . . . ) supplied from external circuits as described above will be appropriately distributed by the multiplexer 11 to the respective interrupt controllers 12, 13 of the CPUs 2 and 3. As the final step in executing the reset interrupt hander program, the operation of CPU 2 branches to the program address 0000h, so that execution of the main routine of the A-side CPU control program by CPU 2 then begins.

In the case of the CPU-specific routine which is executed by the B-side CPU, the CPU 3 performs various initializing operations, then as the final step in that handler routine, the operation of CPU 3 branches to the address C0000h, so that execution of the main routine of the B-side CPU control program by CPU 3 then begins. Thereafter, the CPU 2 executes the processing of its control program (main routine) by readout of instructions within the range of addresses 0000h to BFFFh in the memory 4, while the CPU 3 similarly executes its control program within the range of addresses C000h to DFFFh.

It can thus be understood that with this embodiment, when operation of the computer system is started after a reset interrupt has occurred, the CPUs 2, 3 can begin to execute respectively different control programs which are stored in respective contiguous address ranges of the memory 4, and that this is enabled by each CPU utilizing the corresponding CPU identification value, read out from the corresponding CPU identification register, for self-identification.

The above operation has been described for the case of the reset interrupt. However during normal operation, when two interrupt signals are distributed both to the CPU 3 side and the CPU 2 side of the system, it is possible that these interrupt signals may be assigned the same interrupt level. In that case with this embodiment, the same interrupt vector address will be generated both at the CPU 2 side and the CPU 3 side, in spite of the fact that the two interrupts may result from different sources, i.e., in spite of the fact that respectively different interrupt handler routines should be executed by the CPUs 2 and 3 to process the interrupts. However with the present embodiment in such a case, these respectively different interrupt handler routines which are to be invoked from the same interrupt vector are stored in respective contiguous address ranges of memory 4, as sections (CPU-specific routines) in an interrupt handler program having the form described above for the case of the reset interrupt. That is, the interrupt handler program begins with instructions which result in a CPU performing self-identification as described above, then branching to the appropriate CPU-linked routine.

Thus when such a condition occurs with this embodiment, in a similar manner to that described for reset interrupt processing, the following sequence occurs. For each CPU, when an interrupt signal for an interrupt of specified level is supplied to the CPU, the memory address of the corresponding interrupt vector is generated by that CPU. The address value which is specified in the interrupt vector is thereby read out from memory 4, and loaded into the program counter (in the same manner as for the address E000h in the example of FIG. 3), i.e., operation of that CPU branches to the start of the appropriate interrupt handler program. The CPU then reads out the identification value (0000h or E100h) which is stored in the corresponding identification register 9 or 10. Based on judgement of the identification value thus read out, operation of that CPU then branches to the start of the CPU-linked interrupt handler routine which corresponds to that identification value. Thereafter, interrupt processing and subsequent return from the interrupt are performed in the usual manner.

In that way, the invention enables respectively different types of interrupt processing to be executed by each of a plurality of CPUs, in response to the same interrupt vector.

Thus with this embodiment, respective control programs which are executed by the CPUs 2, 3 of a microcomputer are stored together in respective contiguous blocks of addresses within a continuous range of addresses in a memory 4, which is connected to a common bus 6. When a specific readout address is outputted from each of the CPUs 2, 3, respectively different identification values are read out from the respective identification registers 9, 10 which are connected to the respective local buses 7, 8 of the CPUs 2 and 3. Based on these different identification values, the CPUs 2, 3 subsequently begin to read out and execute the contents of respectively different control programs from the memory 4. It thus becomes possible for such a multiprocessor system to use a single memory to store the respective control programs of the various CPUs, so that the amount of excess capacity which must be assigned for the memory 4 can be reduced, and the utilization efficiency of that memory can be enhanced.

Furthermore as described above, when the CPUs 2, 3 are identical models, and so specify the same set of interrupt vectors in response to identical interrupt signals supplied thereto, respectively different interrupt handler routines (to be executed by respective CPUs) may be assigned to one interrupt vector. This is achieved by controlling branching to respectively different interrupt handler routines based on judgement of the aforementioned CPU identification values.

In that way with the above embodiment the CPUs 2, 3 can execute respectively different interrupt handling processing in response to the same interrupt vector. This is achieved in a very simple manner, i.e., each of the identification registers 9, 10 corresponding to the CPUs 2, 3 have the same readout address. Thus as shown in FIG. 3 it is only necessary to use a single readout instruction, for application to both of the identification registers 9 and 10. In addition, that same readout instruction can be used in all of the interrupt handler programs, such as that for the reset interrupt, which contain a plurality of CPU-linked routines as described above.

With the embodiment described above, respective control programs to be executed by a plurality of CPUs are stored in a single memory. It would be possible to envisage a system whereby the CPUs generate the same program addresses for their respectively different control programs, but hardware is used to convert these to respectively different address values before being supplied to the common bus of the memory which stores the control programs. However if such a method were to be used, then when the respective control programs of the CPUs are being developed, it would be necessary to provide in each program a portion for recognizing addresses which have been converted. Hence, preparation of such a program would be difficult. Furthermore it would be necessary for each of the control programs to be stored in completely separate (i.e., non-contiguous) memory areas, so that the total amount of memory capacity required to store these programs would become large.

With the present invention however, problems of the type described above are entirely eliminated.

Figure 5:
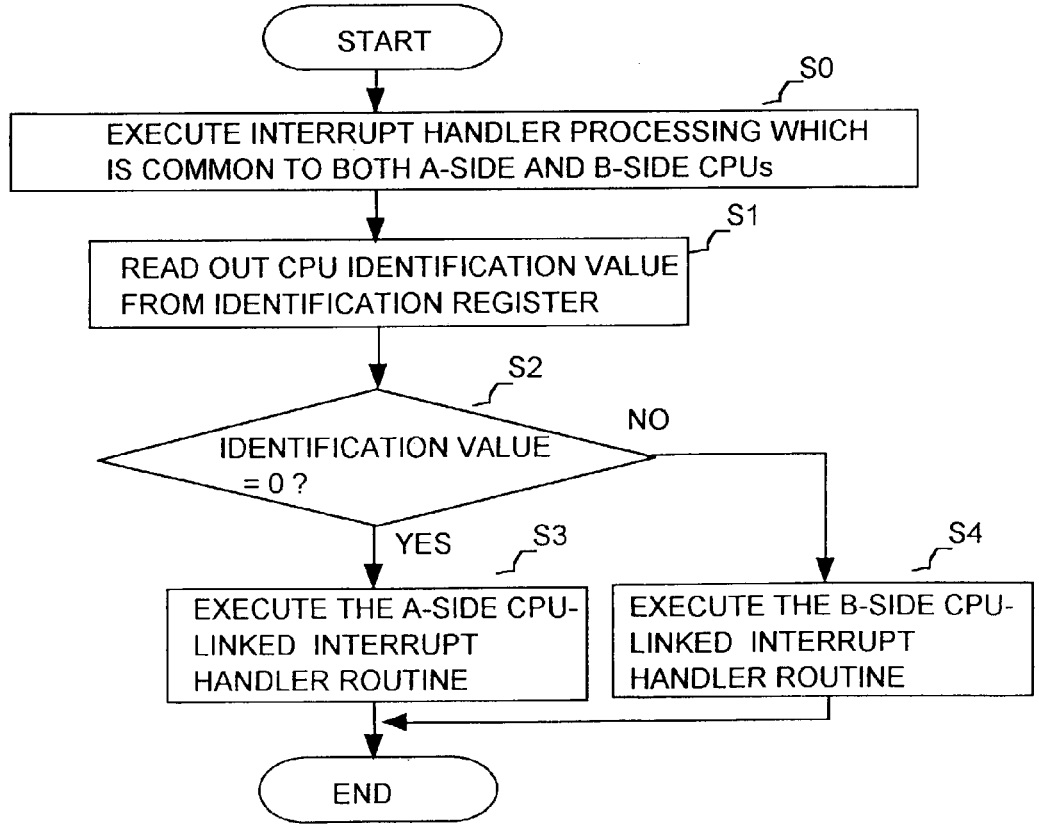
FIG. 5 is a basic flow diagram of the operation of an alternative form of an interrupt handler program.
Figure 6:
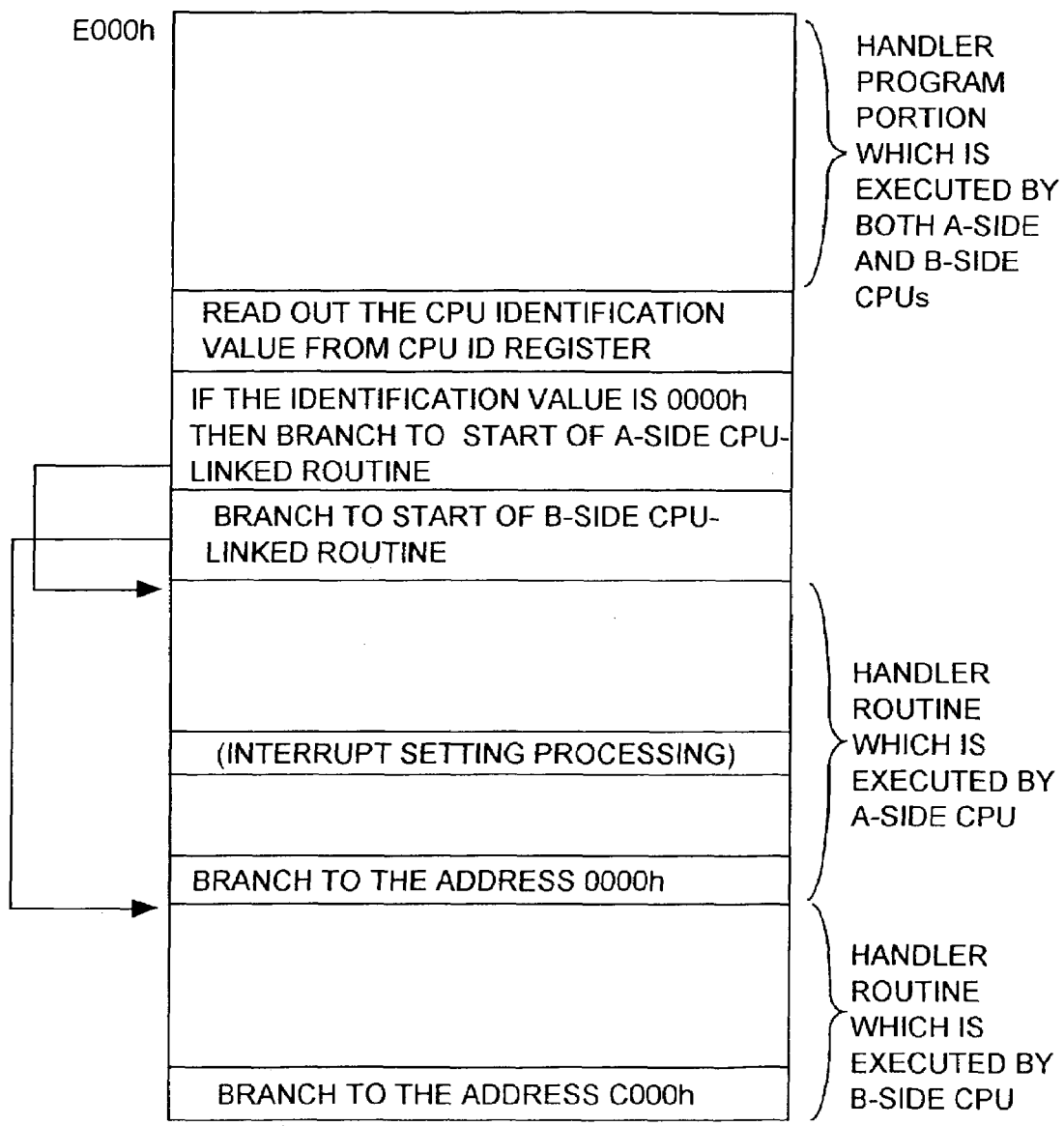
FIG. 6 is a conceptual diagram of the alternative form of interrupt handler program shown in FIG. 5.

In addition, a further advantage may be obtained with an alternate form of the above embodiment, as illustrated in the flow diagram of FIG. 5 and conceptual diagram of interrupt handler program contents shown in FIG. 6. Specifically, it is possible that when an interrupt handler program contains a plurality of CPU-linked routines to be executed by respective CPUs as described above, each of these routines may contain portions such as initializing of internal registers, etc., which are common to all of them. With the present invention in such a case, the interrupt handler program may be configured such that the common processing is executed immediately after execution of the interrupt handler program is commenced, i.e., prior to CPU self-identification and execution branching being performed. Execution of such a common portion of the processing is indicated as step S0 in the flow diagram of FIG. 5. On completion of that processing, judgement of the CPU identification value and branching to the appropriate CPU-specific handler routine are then performed, in steps S1, S2, the same way as described hereinabove referring to FIG. 4.

In that way, the total program size can be reduced.

It can thus be understood that the essential features of a multiprocessor system according to the present invention are that:

(a) each CPU is connected to a corresponding CPU identification register, (b) the CPU identification registers have respectively different identification values fixedly stored therein, i.e., identification values which are assigned to the corresponding CPUs, and (c) for each interrupt handler program, if there is at least a part of that interrupt handler program which is to be processed respectively differently by the various CPUs of the system, a set of CPU-linked routines which are respectively specific to these CPUs are included in the interrupt handler program. That set of CPU-linked routines is preceded (in the interrupt handler program execution sequence) by instructions for successively:

(1) obtaining the identification value assigned to the CPU which is executing the interrupt handler program, and (2) branching to the start of one of the CPU-linked routines, with that routine being determined in accordance with the obtained identification value.

As can be understood from the above description, it is a basic advantage of the present invention that a plurality of programs which are to be executed by respective CPUs of a multiprocessor system can be stored together, in respective contiguous blocks of addresses, within a continuous range of addresses of a single memory.

It should be noted that the invention is not limited to a multiprocessor system having the configuration of the embodiment described above and shown in the drawings, and that various alternative configurations or expanded configurations could be envisaged. For example, although an interrupt setting register 14 and multiplexer 11 are used in the above embodiment to distribute input signals to the CPUs, it would be equally possible to fixedly determine the destinations of respective interrupt signals, by hardware.

Furthermore as can be understood from the above description, the invention enables respectively different interrupt handling processing to be executed by the CPUs in response to different interrupts (for example, timer interrupts) which have a common interrupt vector. i.e., due to being assigned the same level or having the same type of source.

The above embodiment has been described for the case of a system in which interrupt levels are assigned by an interrupt controller, and whereby when a level-assigned interrupt signal is supplied to a CPU, the CPU derives an interrupt vector which is fixedly determined (i.e., hardware-determined) by the interrupt level. However the invention is equally applicable to the more general case in which the interrupt level and the interrupt vector are selected for an interrupt through software, based on the source of the interrupt, and in which interrupts having a plurality of different sources may be assigned the same interrupt level, with an interrupt vector being determined in accordance with the interrupt source.

Moreover it will be apparent that the invention is equally applicable to a system having three or more CPUs.

The invention is also applicable to a multi-processor system configured as a one-chip microcomputer.

The invention is also applicable to a system in which one or more of the CPUs is also connected, via its local bus, to a memory which can be accessed only by that CPU, such as a cache memory or data memory.

In addition, although the invention has been described in the above for the case in which each of the CPUs of a multiprocessor system are connected to respective identification registers, it is also possible to provide a configuration whereby it becomes unnecessary for one of the CPUs to have a corresponding identification register assigned thereto. This will be described referring to the embodiment shown in FIG. 7, in which components corresponding to components in the embodiment of FIG. 1 are indicated by identical reference numerals to those of FIG. 1. As shown, this differs from the embodiment of FIG. 1 in that the identification register of the A-side CPU 2 is omitted, and in that a pull-up circuit 20 (described hereinafter) is connected to the data bus of the CPU 2, while a pull-up circuit 21 is connected to the data bus of the B-side CPU 3, i.e., with the circuits 20, 21 functioning as respective data bus control circuits.

Figure 8:
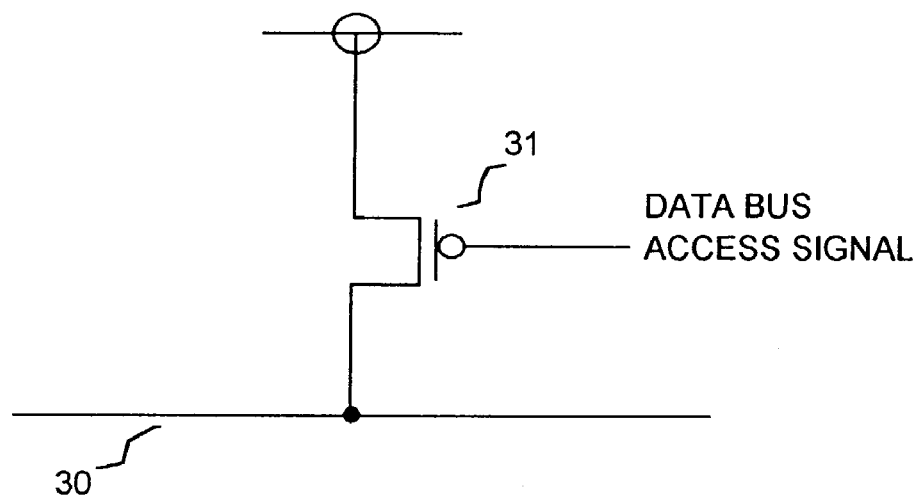
FIG. 8 is a circuit diagram for describing a data bus control circuit in the second embodiment.

Each of the pull-up circuits 20, 21 is formed of a set of PMOS transistors, each of which is connected between the high (H) logic level potential and one of the bit lines of the data bus of CPU 2, as shown for the transistor 31 which is connected to a bit line 30 as illustrated in FIG. 8. Each transistor 31 is controlled by a data bus access signal. The term "data bus access signal" is used in the general sense of a signal which goes to the active state when transfer of data via the data bus of a CPU is enabled.

The operation is as follows. While a CPU 2 or 3 is operating in a condition in which it is not accessing its data bus, each of the bits of that bus are held at the H level, by the corresponding pull-up circuit 20 or 21. When a CPU outputs an address on its address bus, then in general there will be a certain amount of delay before the memory read signal is asserted and data begin to be read out from memory (e.g., memory 4) and supplied to the data bus of that CPU. With this embodiment, during that delay interval, when the data access signal is inactive, all of the bits of the data bus of the A-side CPU 2 will be fixed at the H level by the action of the pull-up circuit 20.

When the aforementioned identification register readout address is outputted on the address bus of the CPU 2, the bits of the data bus of that CPU will be held at the H level for at least the duration of the aforementioned delay, before the pull-up circuit 20 is inactivated and changes in potential of the data bus lines can occur due to data being read out from the memory 4. However when the identification register readout address is generated on the address bus of the B-side CPU 3, then the identification value will be quickly read out from the identification register 10.

In that way, each CPU can perform self-identification, and so can branch to the appropriate interrupt handler routine in a similar manner to that of the embodiment of FIG. 1 as illustrated in the flow diagram of FIG. 4. That is to say, each CPU can discriminate between whether the all H-level condition, or its own CPU identification value, appears on its data bus immediately after that CPU outputs the identification register readout address on its address bus. It can thus be understood that this embodiment is capable of providing the same advantages as the embodiment of FIG. 1.

Figure 7:
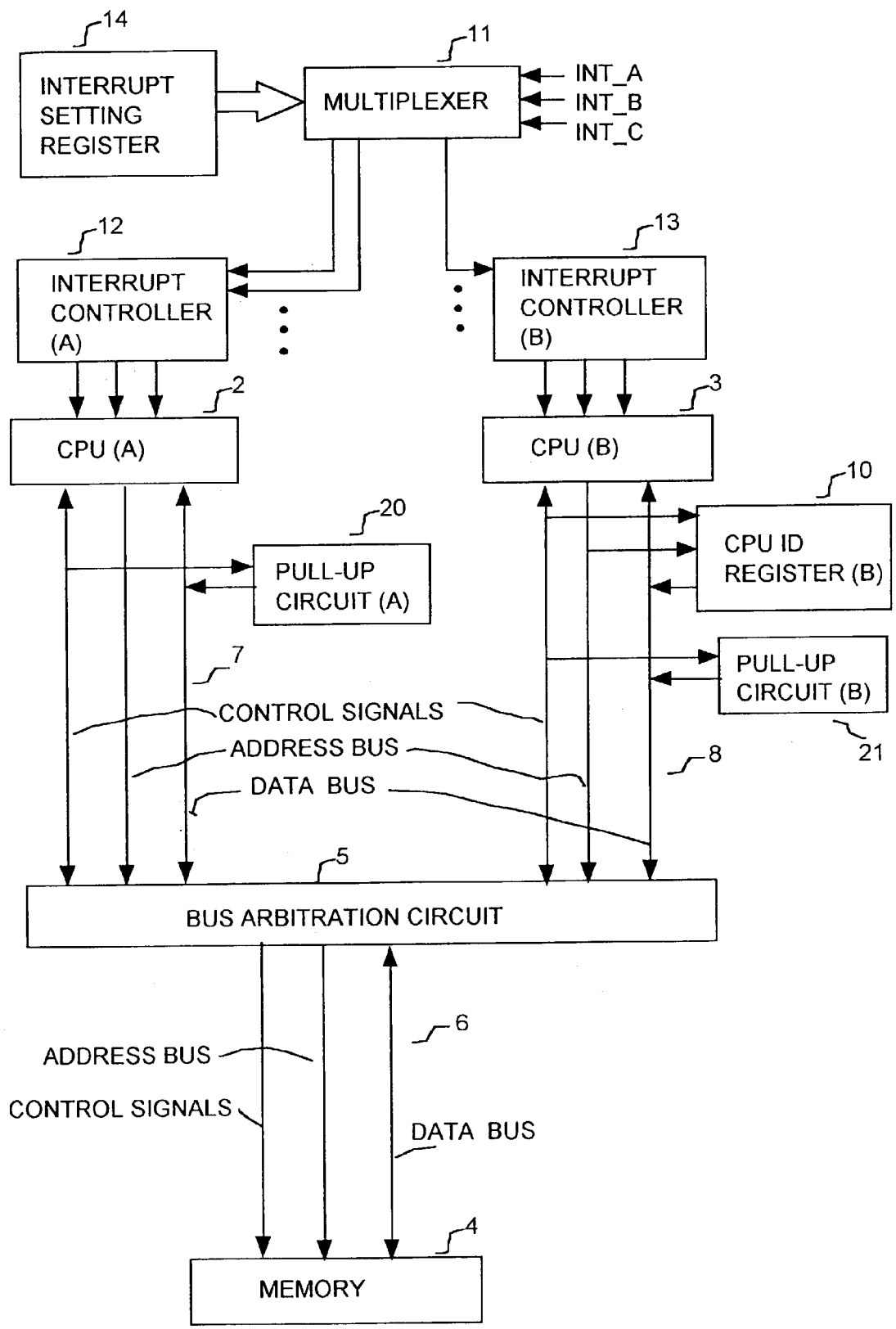
FIG. 7 is a block diagram of a second embodiment of a multiprocessor system.
Figure 10:
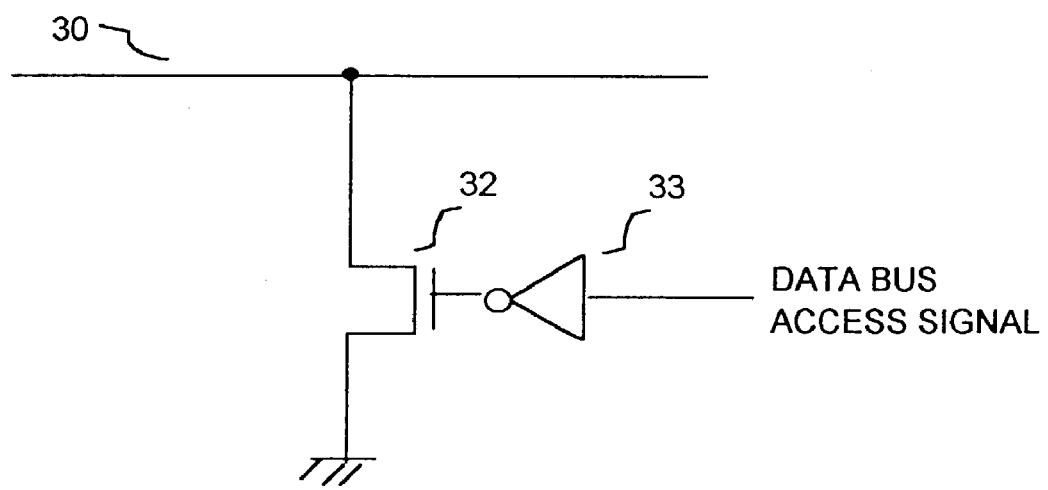
Figure 9:
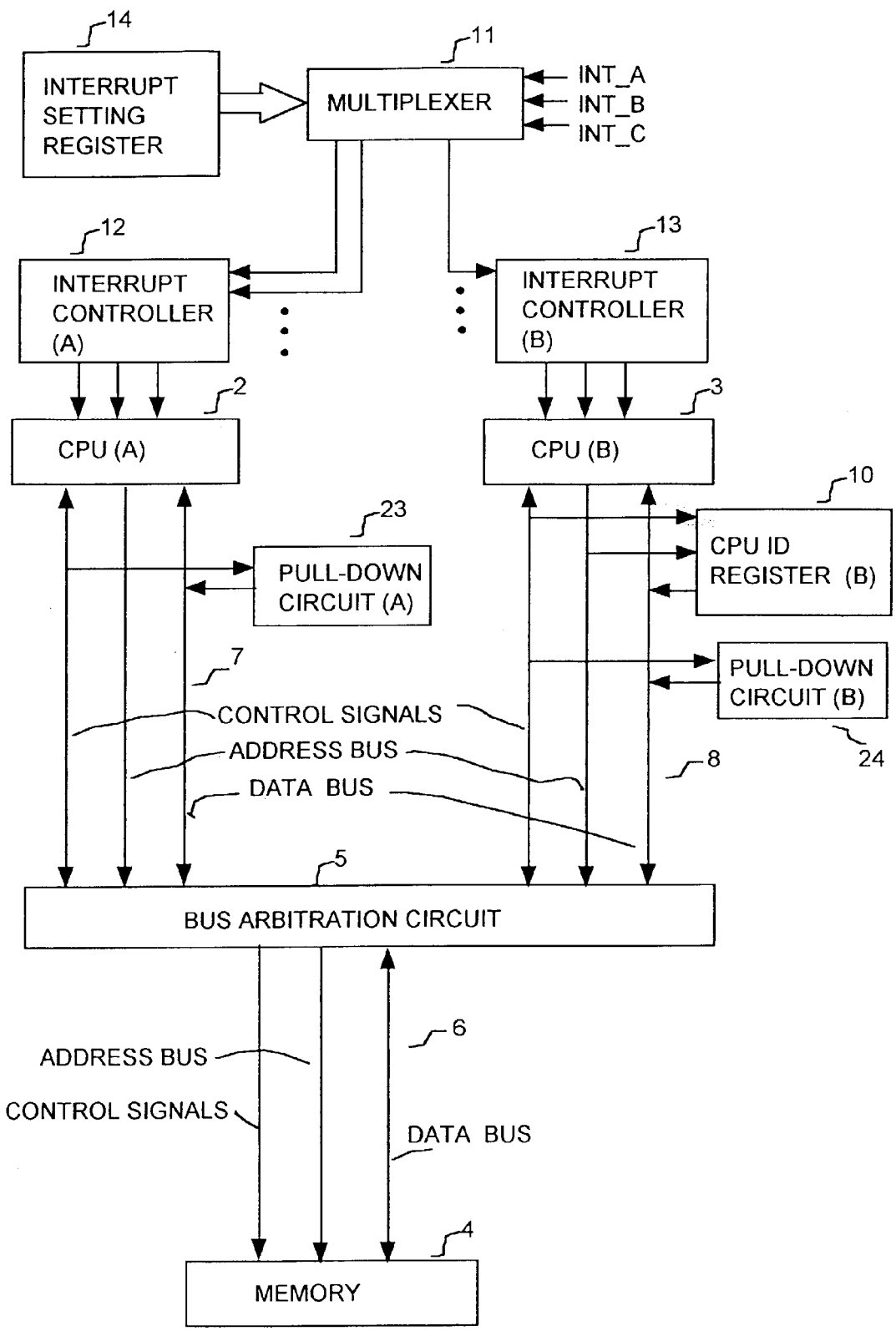
FIG. 9 is a block diagram of a third embodiment of a multiprocessor system; and, FIG. 10 is a circuit diagram for describing a data bus control circuit in the third embodiment.

FIG. 9 shows an alternative form of this embodiment, in which the operation is essentially identical to that of FIG. 7, but pull-down circuits 23, 24 are utilized in place of the pull-up circuits 20, 21 of FIG. 7. The corresponding circuit configuration of a pull-up circuit 23 or 24, for each bit line of a data bus, is shown in FIG. 10. In this case, a transistor 32 is connected between a bit line 30 and the L logic level (i.e., ground potential), and is controlled by the data bus access signal applied via an inverter 33.

Various other alternative configurations of the embodiment of FIG. 7 could be envisaged. In particular, it may possible to simplify the system by connecting a pull-up (or pull-down) circuit to only the data bus of the CPU which is not connected to an identification register, so that only a single pull-up (or pull-down) circuit would be required, irrespective of the total number of CPUs in the multiprocessor system.

Furthermore it is not essential that a pull-up circuit (or pull-down circuit) holds all of the bits of a data bus at the same logic level. It is only necessary that a fixedly predetermined bit pattern is generated on the data bus, and that this so bit pattern is different from all of the respective identification values assigned to the CPUs which are connected to CPU identification registers, and so can be distinguished from the identification values.

Although the embodiments of FIGS. 7, 9 have been described for the case of a multiprocessor system having two CPUs, it will be understood that the principles described can be applied to a system having a greater number of CPUs, and that designating the number of CPUs of the system as an integer n, the number of CPUs which must be connected to respective identification registers in such a system is (n−1).

Thus although the invention has been described in the above referring to specific embodiments, various modifications and alternative forms of these embodiments could be envisaged, which fall within the scope claimed for the invention.

What is claimed is:

1. A multiprocessor system comprising:
a plurality of CPUs (central processing units);
respective local buses, each connected to a corresponding one of said CPUs;
a memory having stored therein a plurality of control programs which are respectively executed by said CPUs;
a common bus which is connected to said memory and can be accessed via said local buses; and
a plurality of data registers constituting identification registers, each connected to only a corresponding one of said CPUs via a respective one of the local buses of the corresponding one of said CPUs;
wherein each of said identification registers has an identification value permanently stored therein, the identification value being unique to said each identification register, and
wherein each of said identification registers is adapted to respond to a readout address supplied from the corresponding one of said CPUs by reading out and supplying to said corresponding CPU said stored identification value,
wherein
each of said CPUs is adapted to respond to input thereto of an interrupt signal relating to a specific interrupt condition by generating information indicative of an interrupt vector predetermined as corresponding to said interrupt condition, said interrupt condition being a condition for which a plurality of said CPUs must execute respectively different interrupt handling processing;

said memory has stored therein an interrupt handler program whose position within said memory is specified by said interrupt vector;

said interrupt handler program includes a plurality of respectively different CPU-linked interrupt handler routines which respectively correspond to said CPUs; and said interrupt handler program includes instructions for causing a CPU which executes said interrupt handler program to successively
generate said readout address and thereby obtain the identification value corresponding to said CPU,
judge said value, and
perform execution branching, in accordance with a result off said judgement, to the one of said CPU-linked interrupt handler routines which corresponds to said CPU.

2. A multiprocessor system as claimed in claim 1, wherein said memory has stored therein a reset interrupt handler program for processing a reset interrupt condition of said system, said reset interrupt handler program having a plurality of said CPU-linked routines respectively corresponding to said CPUs, and wherein each of said CPU-linked routines terminates in an instruction which designates branching of execution to the one of said stored control programs which is assigned to the CPU that corresponds to said CPU-linked routine.

3. A multiprocessor system comprising:
n CPUs (central processing units), where n is an integer greater than one;
respective local buses, each connected to a corresponding one of said CPUs;
a memory having stored therein a plurality of control programs which are respectively executed by said CPUs;
a common bus which is connected to said memory and can be accessed via said local buses; and
a plurality of data registers constituting identification registers, each connected to only a corresponding one of said CPUs via a respective one of the local buses of the corresponding one of said CPUs;
wherein each of said identification registers has an identification value permanently stored therein, the identification value being unique to said each identification register,
wherein each of said identification registers is adapted to respond to a readout address supplied from the corresponding one of said CPUs by reading out and supplying to said corresponding CPU said stored identification value, and
wherein (n−1) of said identification registers are connected to said corresponding identification registers via the respective one of the local buses, and the n-th said CPU is connected to a data bus control means, and
said data bus control means is adapted to maintain a fixed bit pattern on said data bus during a condition in which memory access to said data bus of said n-th CPU is disenabled, and wherein said fixed bit pattern is different from respective bit patterns of said identification values of said (n−1) CPUs.

4. A multiprocessor system comprising:
n CPUs (central processing units) each connected to a corresponding local bus, where n is an integer greater than one;
a memory having stored therein a plurality of control programs which are respectively executed by said CPUs;
a common bus which is connected to said memory and can be accessed via said local buses; and
(n−1) data registers constituting identification registers, each connected only to a corresponding one of (n−1) of said CPUs via the corresponding local bus of said corresponding CPU, the data bus of the n-th data bus being connected to a data bus control means; wherein
each of said identification registers has permanently stored therein an identification value unique to said each register, and each of said identification registers is adapted to respond to receipt of a readout address from the corresponding one of said CPUs by reading out and supplying to said corresponding CPU said stored identification value,
said data bus control means is adapted to maintain a fixed bit pattern on said data bus during a condition in which memory access to said data bus of said n-th CPU is disenabled, and
said fixed bit pattern is different from respective bit patterns of said identification values of said (n−1) CPUs.

5. A multiprocessor system as claimed in claim 1, wherein the control programs are stored contiguously in the memory.

6. A multiprocessor system as claimed in claim 1, wherein the data registers are read-only.

7. A multiprocessor system as claimed in claim 1, wherein each of the CPUS specifies a same interrupt vector, corresponding to a same program in said memory, in response to a same interrupt signal.

8. A multiprocessor system as claimed in claim 4, wherein the control programs are stored contiguously in the memory.

9. A multiprocessor system as claimed in claim 4, wherein the data registers are read-only.

10. A multiprocessor system as claimed in claim 4, wherein each off the CPUS specifies a same interrupt vector, corresponding to a same program in said memory, in response to a same interrupt signal.

11. A multiprocessor system as claimed in claim 3, wherein the control programs are stored contiguously in the memory.

12. A multiprocessor system as claimed in claim 3, wherein the data registers are read-only.

13. A multiprocessor system as claimed in claim 3, wherein each of the CPUs specifies a same interrupt vector, corresponding to a same program in said memory, in response to a same interrupt signal.

14. A multiprocessor system as claimed in claim 1, wherein a single readout address is common to all of said identification registers.

15. A multiprocessor system as claimed in claim 3, wherein a single readout address is common to all of said identification registers.

16. A multiprocessor system as claimed in claim 1,
wherein the interrupt vector is one interrupt vector corresponding to said interrupt condition for which a plurality of said CPUs must execute respectively different interrupt handling processing,
wherein said interrupt handler program is one interrupt handler program whose position within said memory is specified by said one interrupt vector,
wherein the identification value indicates a start address of the one of said CPU-linked interrupt handler routines which corresponds to said CPU.

* * * * *